United States Patent
Tilden

(10) Patent No.: US 7,942,221 B1
(45) Date of Patent: May 17, 2011

(54) METHOD AND SYSTEM FOR ENABLING BI-PEDAL LOCOMOTION

(75) Inventor: Mark Woodruff Tilden, TST East (HK)

(73) Assignee: Wowwee Group Limited, Kowloon (HK)

( * ) Notice: Subject to any disclaimer, the term of this patent is extended or adjusted under 35 U.S.C. 154(b) by 148 days.

(21) Appl. No.: 12/488,331

(22) Filed: Jun. 19, 2009

Related U.S. Application Data

(60) Provisional application No. 61/074,453, filed on Jun. 20, 2008.

(51) Int. Cl.
*B25J 5/00* (2006.01)

(52) U.S. Cl. .............................. 180/8.6; 180/8.1; 180/8.2

(58) Field of Classification Search .................. 180/8.1, 180/8.2, 8.6
See application file for complete search history.

(56) References Cited

U.S. PATENT DOCUMENTS

| | | | | | |
|---|---|---|---|---|---|
| 3,484,988 | A | * | 12/1969 | Robbins | 446/355 |
| 4,282,677 | A | | 8/1981 | Abe | |
| 5,157,316 | A | | 10/1992 | Glovier | |
| 5,159,988 | A | * | 11/1992 | Gomi et al. | 180/8.6 |
| 5,343,397 | A | * | 8/1994 | Yoshino et al. | 701/23 |
| 6,021,363 | A | * | 2/2000 | Nishikawa et al. | 700/253 |
| 6,089,950 | A | * | 7/2000 | Lee et al. | 446/376 |
| 6,243,623 | B1 | * | 6/2001 | Takenaka et al. | 700/245 |
| 6,505,096 | B2 | * | 1/2003 | Takenaka et al. | 700/245 |
| 6,564,888 | B1 | * | 5/2003 | Gomi et al. | 180/8.6 |
| 6,580,969 | B1 | * | 6/2003 | Ishida et al. | 700/245 |
| 6,583,595 | B1 | * | 6/2003 | Hattori et al. | 318/567 |
| 6,917,175 | B2 | * | 7/2005 | Hattori et al. | 318/567 |
| 6,981,562 | B2 | * | 1/2006 | Takahashi | 180/8.6 |
| 7,013,201 | B2 | * | 3/2006 | Hattori et al. | 700/245 |
| 7,053,577 | B2 | * | 5/2006 | Nagasaka | 318/568.12 |
| 7,076,338 | B2 | * | 7/2006 | Kuroki et al. | 700/254 |
| 7,240,747 | B2 | * | 7/2007 | Miyazaki et al. | 180/8.6 |
| 7,289,884 | B1 | * | 10/2007 | Takahashi et al. | 700/245 |
| 2002/0022907 | A1 | * | 2/2002 | Takenaka et al. | 700/245 |
| 2004/0211603 | A1 | * | 10/2004 | Furuta et al. | 180/8.1 |

* cited by examiner

*Primary Examiner* — Joanne Silbermann
*Assistant Examiner* — Michael R Stabley
(74) *Attorney, Agent, or Firm* — Merchant & Gould P.C.

(57) ABSTRACT

A walking bi-pedal robot includes a right leg and a left leg, each coupled with a pelvis via hip lateral angular joints and hip antero-posterior angular joints. Each hip lateral angular joint enables lateral angular motion and each hip antero-posterior angular joint enables antero-posterior angular motion of the respective leg. Right and left feet couple at the distal end of the respective leg via respective ankle lateral angular joints and right and left cables. One end of each cable is coupled with the exterior side of the respective foot. A pelvis motor couples with the right leg, the left leg, the other end of each cable. The pelvis motor generates lateral angular displacement of each leg about the respective hip lateral angular joint and pulls one of the cables according to the direction of the lateral angular displacement. Leg motors generate antero-posterior angular displacement of the respective leg.

11 Claims, 17 Drawing Sheets

METHOD AND SYSTEM FOR ENABLING BI-PEDAL LOCOMOTION

This application claims benefit of U.S. Ser. No. 61/074,453, filed 20 Jun. 2008 and which application is incorporated herein by reference. To the extent appropriate, a claim of priority is made to the above disclosed application.

FIELD OF THE DISCLOSED TECHNIQUE

The disclosed technique relates to mechanical bi-pedal locomotion, in general, and to methods and systems for enabling a mechanical bi-pedal robot to walk in a power efficient manner, in particular.

BACKGROUND

Bi-pedal humanoid robots are known in the art. The bi-pedal robots employ several methods for achieving ambulatory locomotion. One example of a method for achieving bi-pedal ambulatory locomotion is static walking. Static walking describes a method in which the center of mass of the robot is always kept directly above a sole of the robot which is currently touching the ground, thus the robot is always stable. The static walking method requires a processor powerful enough to calculate the centre of mass of the robot at every instant in time.

Another example of a method for achieving bi-pedal ambulatory locomotion is static walking is dynamic walking. In the dynamic walking method the center of mass of the robot is situated outside the sole of the robot, currently touching the ground. The posture of the robot is restored by greatly accelerating a fulcrum in the direction in which the robot has fallen down while the robot is walking. U.S. Pat. No. 6,583,595 B1 issued to Hattori et al., and entitled "Robot and Joint Device for the Same", is directed to a humanoid robot. The robot includes two arms, a head, two legs for moving the humanoid robot, and a trunk. The trunk is coupled with the arms the head and legs. Each of the legs includes a hip joint yaw axis and its respective actuator, a hip joint pitch axis and its respective actuator, a hip joint roll axis and its respective actuator, a knee joint pitch axis and its respective actuator, an ankle joint pitch axis and its respective actuator, an ankle joint roll axis and its respective actuator, a foot, and a main control section. In accordance with, for example, user commands, the main control section sets the movements of the legs, a zero moment point path, and the movement of the trunk. Then, the main control section sends commands for moving the above-described parts of the robot in accordance with the aforementioned setting.

SUMMARY OF THE PRESENT DISCLOSED TECHNIQUE

It is an object of the disclosed technique to provide a novel method and system for enabling Bi-pedal locomotion. In accordance with the disclosed technique, there is thus provided a walking bi-pedal robot. The robot comprises a pelvis, a right leg, a left leg, a left foot, a right foot, a left foot cable, a right foot cable, a pelvis motor, a right leg motor, a left leg motor and a power source. The right leg is coupled with the pelvis via a right hip lateral angular joint and via a right hip antero-posterior angular joint. The right hip lateral angular joint enabling lateral angular motion of the right leg. The right hip antero-posterior angular joint enabling antero-posterior angular motion of the right leg. The left leg is coupled with the pelvis via a left hip lateral angular joint and via a left hip antero-posterior angular joint. The left hip lateral angular joint enabling lateral angular motion of the left leg. The left hip antero-posterior angular joint enabling antero-posterior angular motion of the left leg. The right foot is coupled at the distal end of the right leg via a right ankle lateral angular joint. The left foot is coupled at the distal end of the left leg via a left ankle lateral angular joint. One end of the right foot cable is coupled with the exterior side of the right foot. One end of the left foot cable is coupled with the exterior side of the left foot. The pelvis motor is coupled with the right leg, the left leg, the other end of the right cable and with the other end of the left cable. The pelvis motor produces mechanical motion for generating lateral angular displacement of the right leg and of the left leg about the right hip lateral angular joint and the left hip lateral angular joint respectively. The pelvis motor further pulls one of the left cable and the right cable according to the direction of the lateral angular displacement. The right leg motor is coupled with the right hip antero-posterior angular joint for generating antero-posterior angular displacement of the right leg. The left leg motor is coupled with the left hip antero-posterior angular joint for generating antero-posterior angular displacement of the left leg. The power source provides is coupled with to the pelvis motor, the right leg motor and the left leg motor and provides power thereto.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing a system for controlling a bi-pedal robot. When the robot makes a step with the left leg (i.e., the left leg moves forward), the robot laterally rotates (i.e., perpendicular to the forward direction) a left leg and a right leg thereof, in the left direction, such that the center of mass of the robot shifts to the right leg and the left leg is lifted off the ground. The robot rotates the left leg forward. The robot then rotates the right leg and the left leg back in the right direction until the left foot touches the ground. The robot continues to rotate the right and left leg in the right direction until, the center of mass shifts to the left leg, and the right leg is lifted off the ground. The robot repeats these actions, reversing the role of the left leg with that of the right leg and the direction of lateral rotation.

The term 'stepping cycle' refers herein to the cycle of making a step with the one leg and then making a step with the other leg. The 'stepping period' refers herein to the time period of making a step with the one leg and then making a step with the other leg. When the robot is stabilized on the left foot thereof (i.e., the center of mass of the robot is positioned above the left foot), the left leg is not perpendicular to the ground (i.e., the left leg is inclined with respect to the normal to the ground). However, the left foot remains on the ground. Similarly, when the robot is stabilized on the right foot thereof, the right leg is not perpendicular to the ground. However, the right foot remains on the ground.

The system according to the disclosed technique employs three motors. The first motor rotates the left leg in the forward and backward direction. The second motor rotates the right leg in the forward and backward direction. The third motor rotates both the left leg and the right leg in the lateral direction (i.e., the left and right direction). Furthermore, when the system according to the disclosed technique shifts the center of mass of the robot to the left leg thereof, the third motor pulls on a cable connected to the side of the left foot, thereby ensuring that the entirety of the bottom of left foot remains in contact with the ground (i.e., parallel to the ground). Similarly, when the system according to the disclosed technique shifts the center of mass of the robot to the right leg thereof, the third motor pulls on a cable connected to the side of the right foot, thereby ensuring that the entirety of the bottom of right foot remains on the ground.

Figure 1:
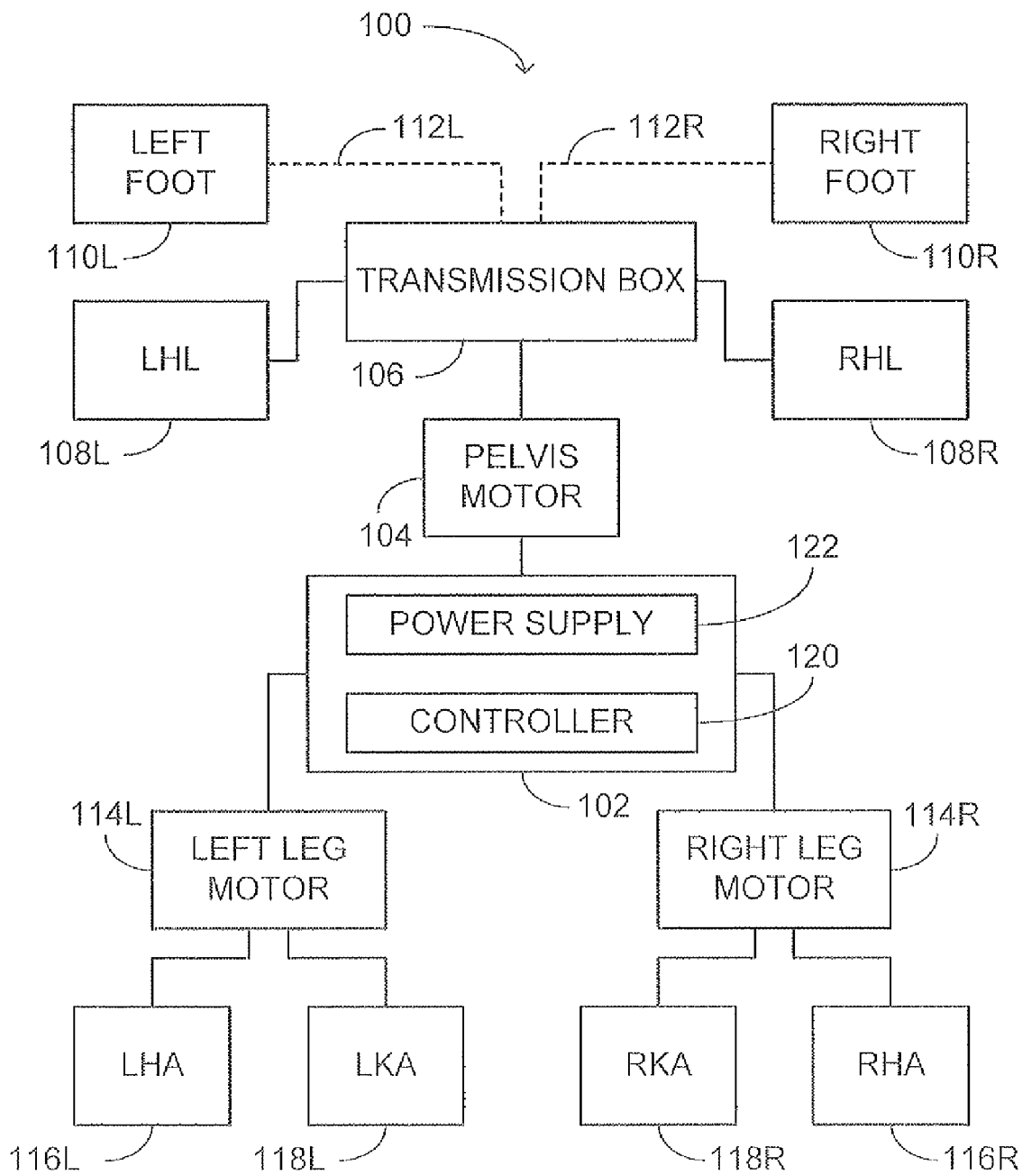
FIG. 1 is a schematic illustration of a system for controlling a bi-pedal robot, constructed and operative in accordance with an embodiment of the disclosed technique.

Reference is now made to FIG. 1, which is a schematic illustration of a system for controlling a bi-pedal robot, generally referenced 100, constructed and operative in accordance with an embodiment of the disclosed technique. System 100 includes a power supply and controller module 102, a pelvis motor 104, a transmission box 106, a Left Hip Lateral joint (LHL) 108L, a Right Hip Lateral joint (RHL) 108R, a left foot 110L, a right foot 110R, a left cable 112L, a right cable 112R, a left leg motor 114L, a right leg motor 114R, a Left Hip Antero-posterior joint (LHA) 116L, a Right Hip Antero-posterior joint (RHA) 116R, a Left Knee Antero-posterior joint (LKA) 118L, and a Right Knee Antero-posterior joint (RKA) 118R. Power supply and controller module 102 includes power supply 122 and controller 120.

Both Power supply and controller module 102 are coupled with pelvis motor 104, left leg motor 114L, and with right leg motor 114R. Transmission box 106 is coupled with pelvis motor 104, LHL 108L, RHL 108R. Transmission box 106 is further coupled with left foot 110L and right foot 110R, via left cable 112L and right cable 112R, respectively. Left leg motor 114L is coupled with LHA 116L and with LKA 118L. Right leg motor is 114R is coupled with RHA 116R and with RKA 118R.

Each of pelvis motor 104, left leg motor 114L, and right leg motor 114R produces a mechanical motion. Each of pelvis motor 104, left leg motor 114L, and right leg motor 114R can be in form of a rotary electromechanical motor, linear electromechanical motor, hydraulic actuator, pneumatic actuator, and the like. Power supply 122 supplies power to pelvis motor 104, left leg motor 114L and to right leg motor 114R.

Power supply 122 can be in the form of an electrical power source, hydraulic power source, or a pneumatic power source, depending on the type of pelvis motor 104, left leg motor 114L, and right leg motor 114R. Controller 120 is in the form of a logical device (e.g., semiconductor processor, programmable logical device), which controls pelvis motor 104, left leg motor 114L, and right leg motor 114R.

Transmission box 106 includes a plurality of mechanical parts, such as gears, bearings, shafts, belts, pulleys, and the like. Pelvis motor 104 generates mechanical motion. Transmission box 106 transmits this motion to LHL 108L, RHL 108R, left cable 112L, and right cable 112R. LHL 108L and RHL 108R are joints which enable lateral angular displacement (i.e., each joint enables sideways rotation motion). LHA 116L and RHA 116R are joints which enable antero-posterior (i.e., forward-backward) angular displacement. LKA 118L and RKA 118R are joints which also enable antero-posterior angular displacement. Left leg motor 114L moves both LHA 116L and LKA 118L. Right leg motor 114R moves (i.e., provides mechanical motion) both RHA 116R and RKA 118R.

Figure 2A:
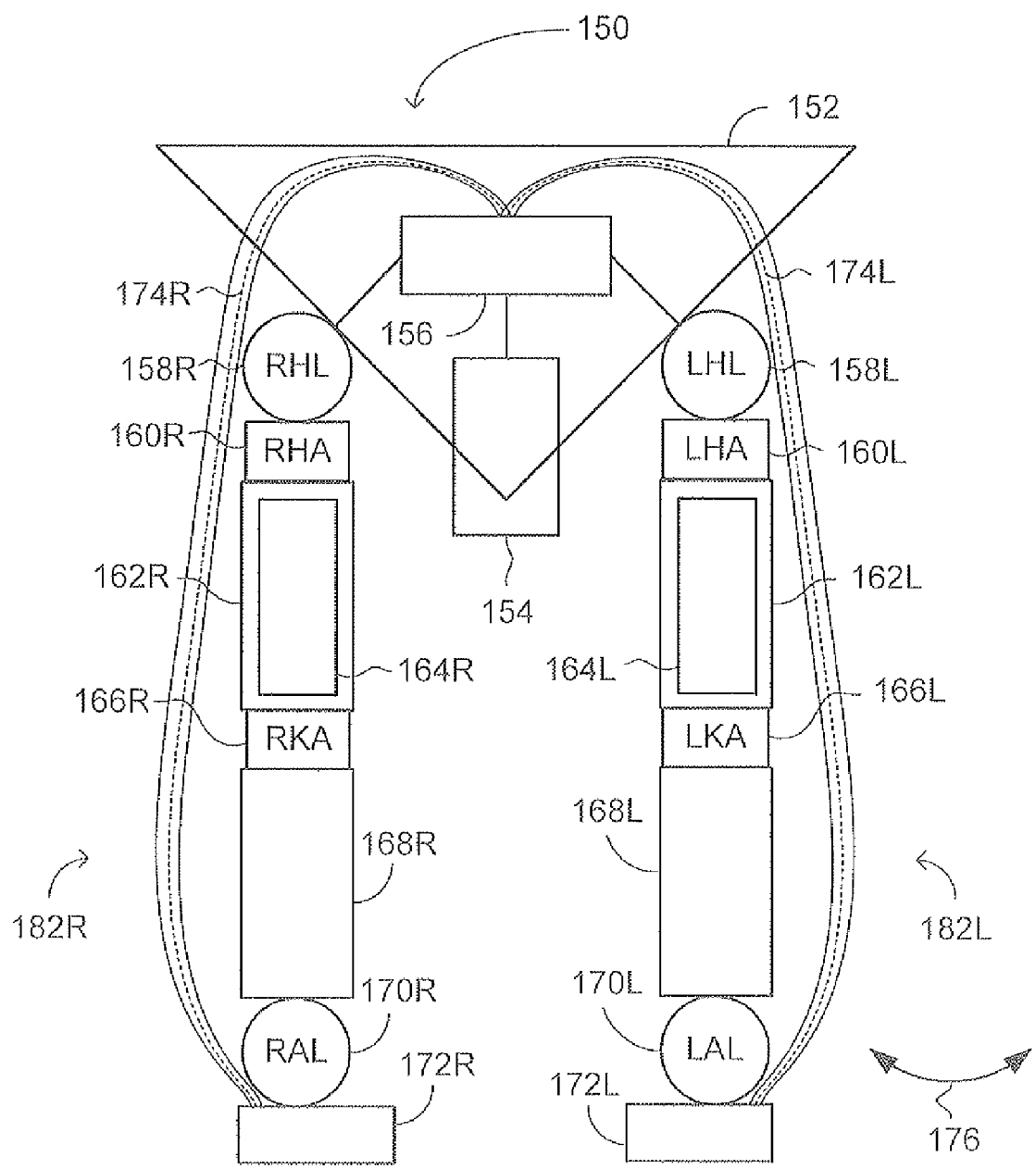
FIG. 2A is a schematic illustration of a front view of a bi-pedal locomotive robot, constructed and operative in accordance with another embodiment of the disclosed technique.
Figure 2B:
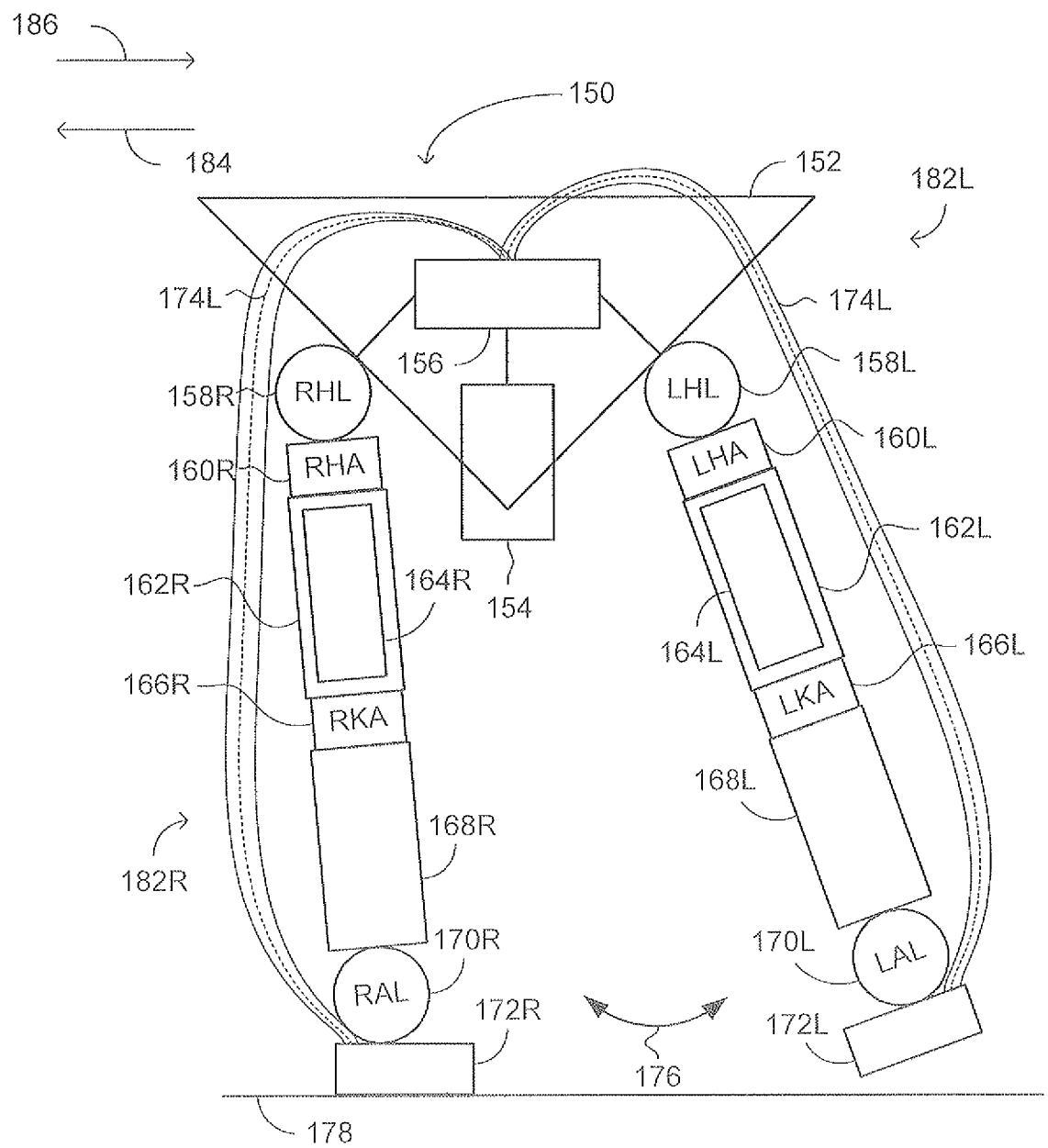
FIG. 2B is a schematic illustration of a front view of the bi-pedal locomotive robot of FIG. 2A, when a left leg thereof is lifted off the ground in the left direction.
Figure 2C:
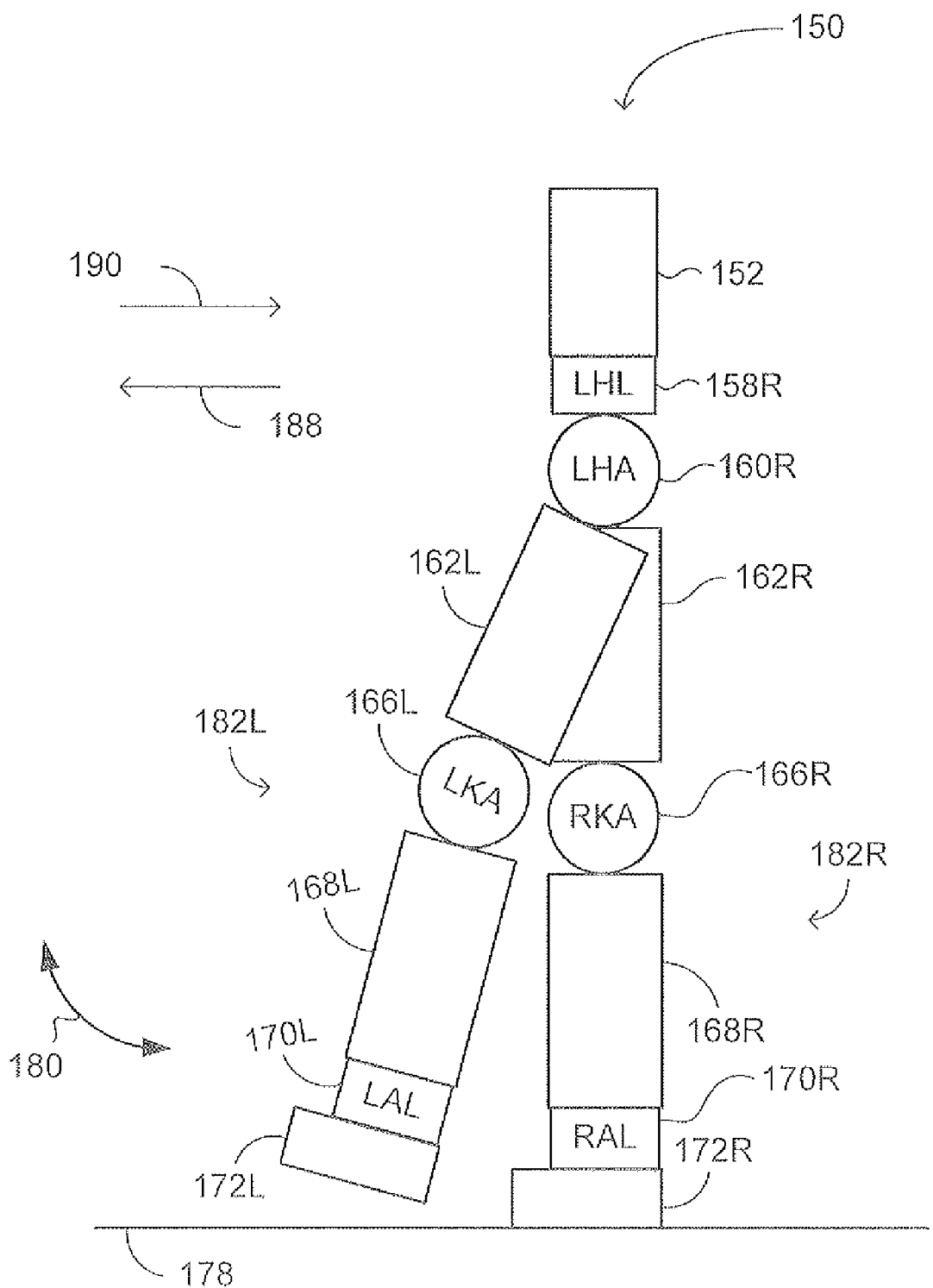
FIG. 2C is a schematic illustration of a side view of the bi-pedal locomotive robot of FIG. 2A, with the left leg thereof lifted off the ground and positioned anteriorly to a pelvis thereof.
Figure 2D:
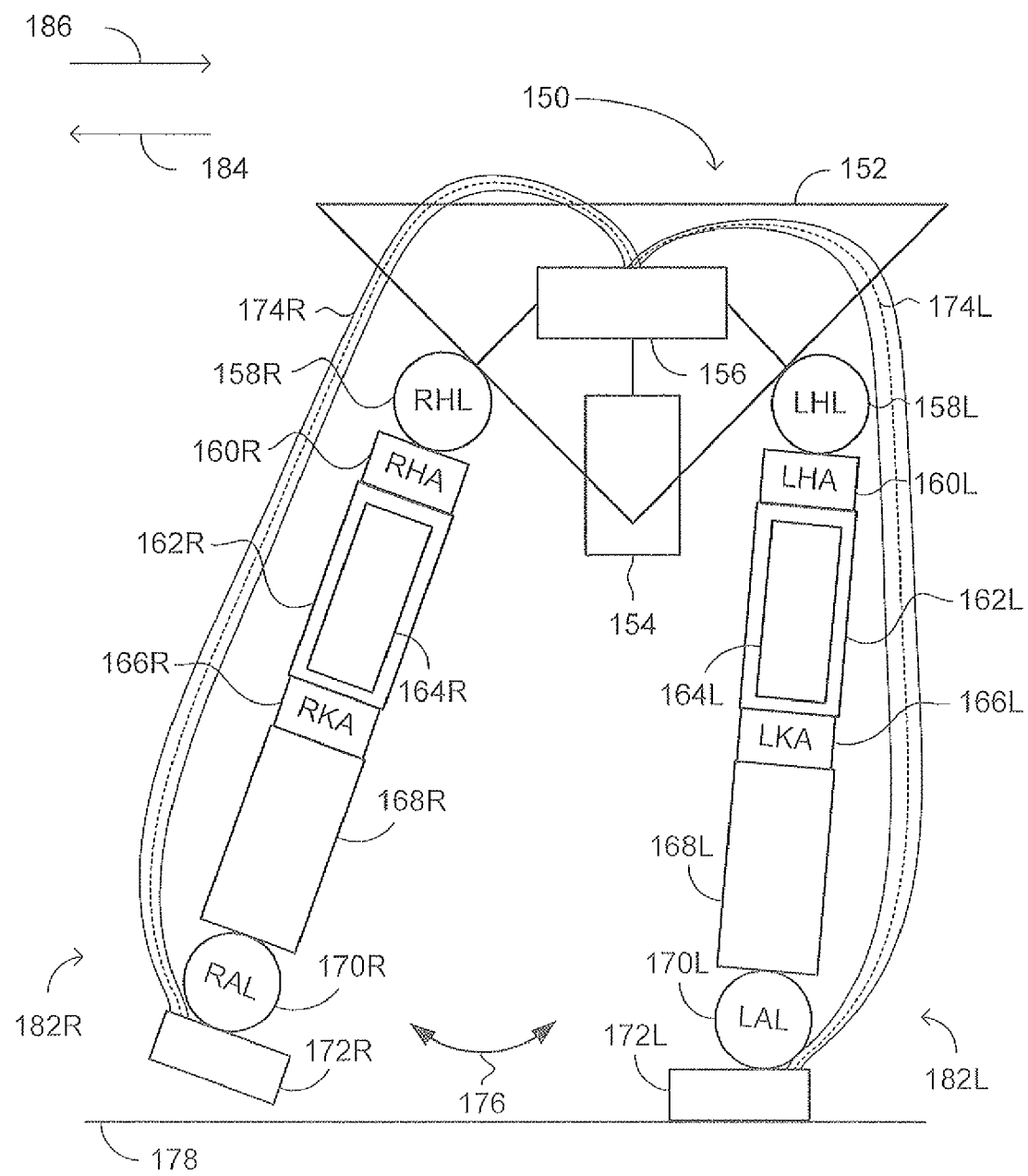
FIG. 2D is a schematic illustration of a front view of the bi-pedal locomotive robot of FIG. 2A, with a right leg thereof lifted off the ground in the right direction.
Figure 2E:
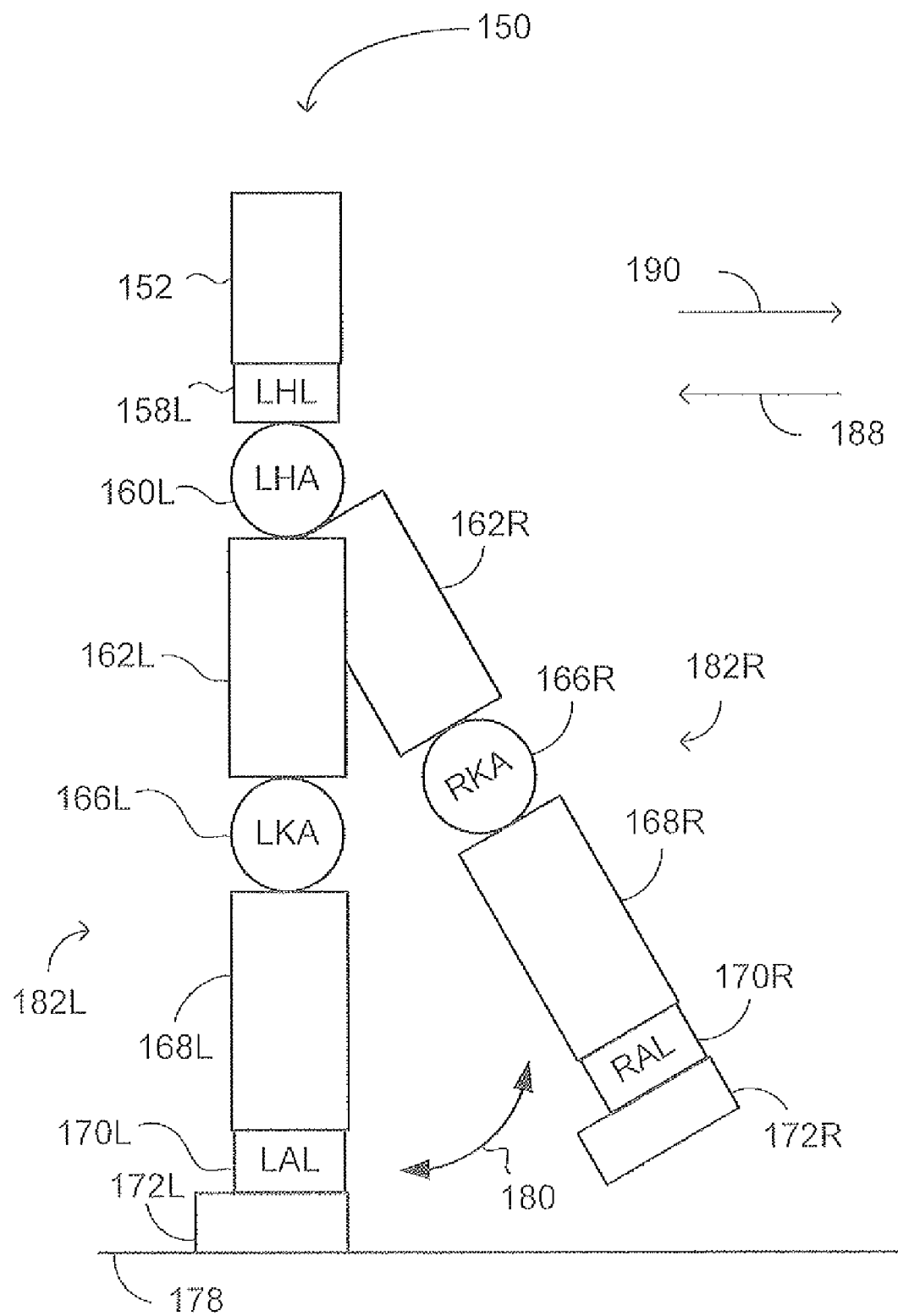
FIG. 2E is a schematic illustration of a side view of the bi-pedal locomotive robot of FIG. 2A, with the left leg thereof lifted off the ground and positioned posteriorly to the pelvis thereof.

Reference is now made to FIGS. 2A, 2B, 2C, 2D, and 2E which are schematic illustrations of a bi-pedal locomotive robot, generally referenced 150, constructed and operative in accordance with another embodiment of the disclosed technique. FIG. 2A is a schematic illustration of a front view of a Robot 150. FIG. 2B is a schematic illustration of a front view of robot 150, when a left leg 182L thereof is lifted off the ground in the left direction. FIG. 2C is a schematic illustration of a side view of robot 150, with left leg 182L thereof lifted off the ground and positioned anteriorly to a pelvis thereof. FIG. 2D is a schematic illustration of a front view of robot 150, with right leg 182R lifted off the ground in the right direction. FIG. 2E is a schematic illustration of a side view of robot 150, with left leg 182L lifted off the ground and positioned posteriorly to the pelvis thereof.

Bi-pedal locomotive robot 150 includes a pelvis 152, left leg 182L, right leg 182R, a pelvis motor 154, a transmission box 156, a left foot 172L, a right foot 172R, a Left Ankle Lateral joint (LAL) 170L, a Right Ankle Lateral joint (RAL) 170R, a left foot cable 174L, and a right foot cable 174R. Left leg 182L includes a Left Hip Lateral joint (LHL) 158L, a Left Hip Antero-posterior joint (LHA) 160L, a left thigh 162L, a left leg motor 164L, a Left Knee Antero-posterior joint (LKA) 166L and a left calf 168L. Right leg 182R includes, a Right Hip Lateral joint (RHL) 158R, a Right Hip Antero-posterior joint (RHA) 160R, a right thigh 162R, a right leg motor 164R, a Right Knee Antero-posterior joint (RKA) 166R and a right calf 168R.

Transmission box 156 is coupled with pelvis motor 154, Left foot 172L and with right foot 172R. One end of left foot cable 174L is coupled with transmission box 156 and the other end of cable left foot 174L is coupled with the exterior side of left foot 172L. One end of right foot cable 174R is coupled with transmission box 156 and the other end of right foot cable 174R is coupled with the exterior side of left foot 172R. Left thigh 162L is coupled at the proximal end (not shown—proximal relative to pelvis 152) thereof with pelvis 152 via LHL 158L and LHA 160L. Left leg motor 164L is mounted on left thigh 162L and is coupled with LHA 160L and with LKA 166L. Left calf 168L is coupled at the proximal end (not shown—proximal relative to pelvis 152) thereof with left thigh 162L via LKA 166L. Left calf 168L is coupled at the distal end (not show—distal relative to pelvis 152) thereof with left foot 172L via LAL 170L.

Right thigh 162R is coupled at the proximal end (not shown) thereof with pelvis 152 via RHL 158R and RHA 160R. Right leg motor 164R is mounted on right thigh 162R and is coupled with RHA 160R and with RKA 166R. Right calf 168R is coupled at the proximal end (not shown) thereof with right thigh 162R via RKA 166R. Right calf 168R is coupled at the distal end (not show) thereof with right foot 172R via RAL 170R. Each of pelvis motor 154, transmission box 156, LHL 158L, RHL 158R, LHA 160L, RHA 160R, LKA 166L, and RKA 166R are substantially similar to each of pelvis motor 104, transmission box 106, LHL 108L, RHL 108R, LHA 116L, RHA 116R, LKA 118L, and RKA 118R of FIG. 1, respectively.

Each of RHL 158R and RHL 158L enables each of right thigh 162R and left thigh 162L, respectively, to rotate laterally there-about. Each of RHA 160R and LHA 160L enables each of right thigh 162R and left thigh 162L, respectively, to rotate antero-posteriorly there-about. Each of RKA 166R and LKA 166L enables each of right calf 168R and left calf 168L, respectively, to rotate antero-posteriorly there-about. Each of RAL 170R and LAL 170L enables each of right foot 172R and left foot 172L, respectively, to rotate laterally there-about.

In the example set forth in FIG. 2A, robot 150 is standing still on both left leg 182L and right leg 182R. Left leg 182L is positioned next to right leg 182R (i.e., left leg 182L is neither in-front nor behind right leg 182R). The Center of Mass (CoM) of robot 150 is positioned above the middle point (not shown) between left foot 172L and right foot 172R. Robot 150 is able to walk forward, walk backward, walk sideways, rotate to either, clockwise or counter clockwise direction, and the like. Robot 150 is further able to walk at a plurality of gaits and sizes of paces.

An example of robot 150 walking forward (i.e., an example of a stepping cycle—left leg first) is described herein below with reference to FIGS. 2A, 2B, 2C, 2D, and 2E. Pelvis motor 154 generates mechanical motion. Transmission box 156 transmits this mechanical motion to left leg 182L and right leg 182R, such that each of left leg 182L and right leg 182R, rotates about LHL 158L and RHL 158R, respectively, in a counter clock wise direction. In this manner, pelvis motor 154 shifts the CoM of robot 150 from the middle point between left foot 172L and right foot 172R, to a position above right foot 172R. Furthermore, pelvis motor 154 pulls right foot cable 174R until right foot 172R is fixed in the position depicted in FIG. 2B (i.e., fixing the lateral angular position of right foot 172R when the center of mass is above right foot 172R such that the entirety of the bottom of right foot 172R is in contact platform 178). Pelvis motor 154 continues to rotate left leg 182L and right leg 182R about LHL 158L and RHL 158R, respectively and to pull right foot cable 174R until left leg 182L is lifted in the air, as depicted in FIG. 2B. It is noted that, pelvis motor 154, via transmission box 156, may decrease the rotation rate of right leg 182R relative to that of left leg 182L, as pelvis motor 154 continues to move left leg 182L and right leg 182R in the left direction, and vice versa (i.e., in the example depicted in FIG. 2A, the rotation rate of both left leg 182L and right leg 182R is substantially equal, in the example depicted in FIG. 2B, the rotation rate of left leg 182L is larger than that of right leg 182R). In other words, rotation rates of left leg 182L and right leg 182R are non-linear (i.e., differential rotation rates).

When pelvis motor 154 rotates left leg 182L and right leg 182R, so as to shift the CoM of robot 150 over to the right, a lateral moment is exerted on robot 150. This lateral moment creates a lateral motion of robot 150 in the direction of arrow 184. When pelvis motor 154 ceases from rotating left leg 182L and right leg 182R, robot 150 might sway from side to side (i.e., until robot 150 reaches equilibrium and stabilizes on right foot 172R). Pelvis motor 154 rotates left leg 182L until left foot 172L is lifted above platform 178. Left foot cable 174L is kept loose, and thus, left foot 172L can freely rotate about RAL 170 (i.e., within a predetermined range of angles). Consequently, when robot 150 sways in the direction of arrow 186, left foot 172L is lowered toward platform 178. When left foot 172L is in contact with platform 178, left foot 172L dumps the swaying of robot 150.

When left leg 182L in the air, left leg motor 164L rotates left leg 182L, via LHA 160L and LKA 166L in the forward direction (i.e., anteriorly in the direction of arrow 188) as depicted in FIG. 2C. When left leg 182L reaches the position depicted in FIG. 2C, left leg motor 164L ceases to rotate left leg 182L. Pelvis motor 154 rotates left leg 182L and right leg 182R in a clockwise direction, until left foot 172L touches platform 178 and until right foot 172R is lifted off platform 178, as depicted in FIGS. 2D and 2E. Right foot 172R decrease the moment of motion of right leg 182R and dumps possible swaying of robot 150, similarly to left foot 172L (i.e., as described hereinabove in conjunction with FIG. 2C). In this manner, pelvis motor 154 shifts the CoM of robot 150 from a position above right foot 172R to a position above left foot 172L. Furthermore, pelvis motor 154 pulls left foot cable 174L until left foot 172L is fixed in the position depicted in FIG. 2D (i.e., fixing the lateral angular position of left foot 172L when the center of mass is above left foot 172L such that the entirety of the bottom of left foot 172L is in contact platform 178). Pelvis motor 154 loosens right foot cable 174R and thus, right foot 172R. In order for robot 150 to continue walking, robot 150 repeats the actions described herein above, with relation to the right leg 182R, on the left leg 182L, and vice versa. Thus, robot 150 achieves bi-pedal locomotion and is walking forward.

Another example of movement patterns performed by robot 150 is walking backwards. Robot 150 walks backwards in a substantially similar manner to walking forward, except the direction of rotation of the legs about the antero-posterior axis, as detailed herein below. Robot 150 shifts its CoM and positions the CoM thereof above one of its feet (e.g., left foot 172L—as detailed herein above with reference to FIG. 2B). Robot 250 lifts the opposite leg (e.g., right leg 182R) in the air. Robot 150 rotates the lifted leg posteriorly (i.e., instead of anteriorly in forward walk) for walking backwards.

Yet another example of a movement pattern performed by robot 150 is turning around. Described herein below is a clockwise turn movement pattern (i.e., clockwise turning cycle). Pelvis motor 154 generates mechanical motion. Transmission box 156 transmits this mechanical motion to left leg 182L and right leg 182R, such that each of left leg 182L and right leg 182R, rotates about LHL 158L and RHL 158R, respectively, in a counter clock wise direction. In this manner, pelvis motor 154 shifts the CoM of robot 150 to a position above right foot 172R (i.e., right foot 172R is employed as a pivot for the clockwise turn). Furthermore, pelvis motor 154 pulls right foot cable 174R until right foot 172R is fixed in the position depicted in FIG. 2B, and left leg 182L is lifted in the air (i.e., lifted off platform 178).

When left leg 182L in the air, left leg motor 164L rotates left leg 182L, via LHA 160L and LKA 166L in the forward direction (i.e., anteriorly in the direction of arrow 188) as depicted in FIG. 2C. When left leg 182L reaches the position depicted in FIG. 2C, left leg motor 164L ceases to rotate left leg 182L. Pelvis motor 154 rotates left leg 182L and right leg 182R in a clockwise direction, until left foot 172L touches platform 178. Thus, both left foot 172L and right foot 172R are touching platform 178. In this manner, the CoM of robot 150 is positioned approximately above the middle point (not shown) between right foot 172R and left foot 172L, left foot 172L is positioned ahead (i.e., in-front) of right foot 172R and LKA 166L is flexed while RKA 166R is extended.

At this point, left leg motor 164L extends left leg 182L (i.e., rotates left thigh 162L posteriorly). Right leg motor 164R flexes right leg 182R (i.e., rotates right thigh 162R anteriorly). In this manner, each of right foot 172R and left foot 172L maintains its position on platform 178, while robot 150 makes a clockwise turn. It is noted that, right foot 172R operates as a pivot for the clockwise turn and maintains its position on platform 178 throughout the turning maneuver.

Likewise, when making a counter-clockwise turn, left foot 172L operates as a pivot. Robot 150 positions right leg 182R ahead of left leg 182L and ahead of pelvis 152. Right leg 182R is flexed (i.e., RKA 166R is flexed). Left leg 182L is extended (i.e., LKA 166L is extended). Robot 150 extends right leg 182R and flexes left leg 182L, thus making a counter clockwise turn.

Robot 150 has two modes of operation, one motor operation and two motors operation. In the one motor operation mode, no more than a single motor is working at any given moment during the stepping cycle (i.e., motor operation is chronologically separated). In the example set forth in FIGS. 2A, 2B, 2C, 2D, and 2E. Robot 150 operated at a single motor mode. Alternatively, robot 150 works in a two motor mode (i.e., two motors can work simultaneously at least during a portion of the stepping period). For example, while pelvis motor 154 rotates right leg 182R and left leg 182L in the right direction and right leg 182R is lifted off the ground, right leg motor 164R rotates right leg 182L in the forward direction. In this manner, a more fluent and fast paced motion is generated.

Figure 3:
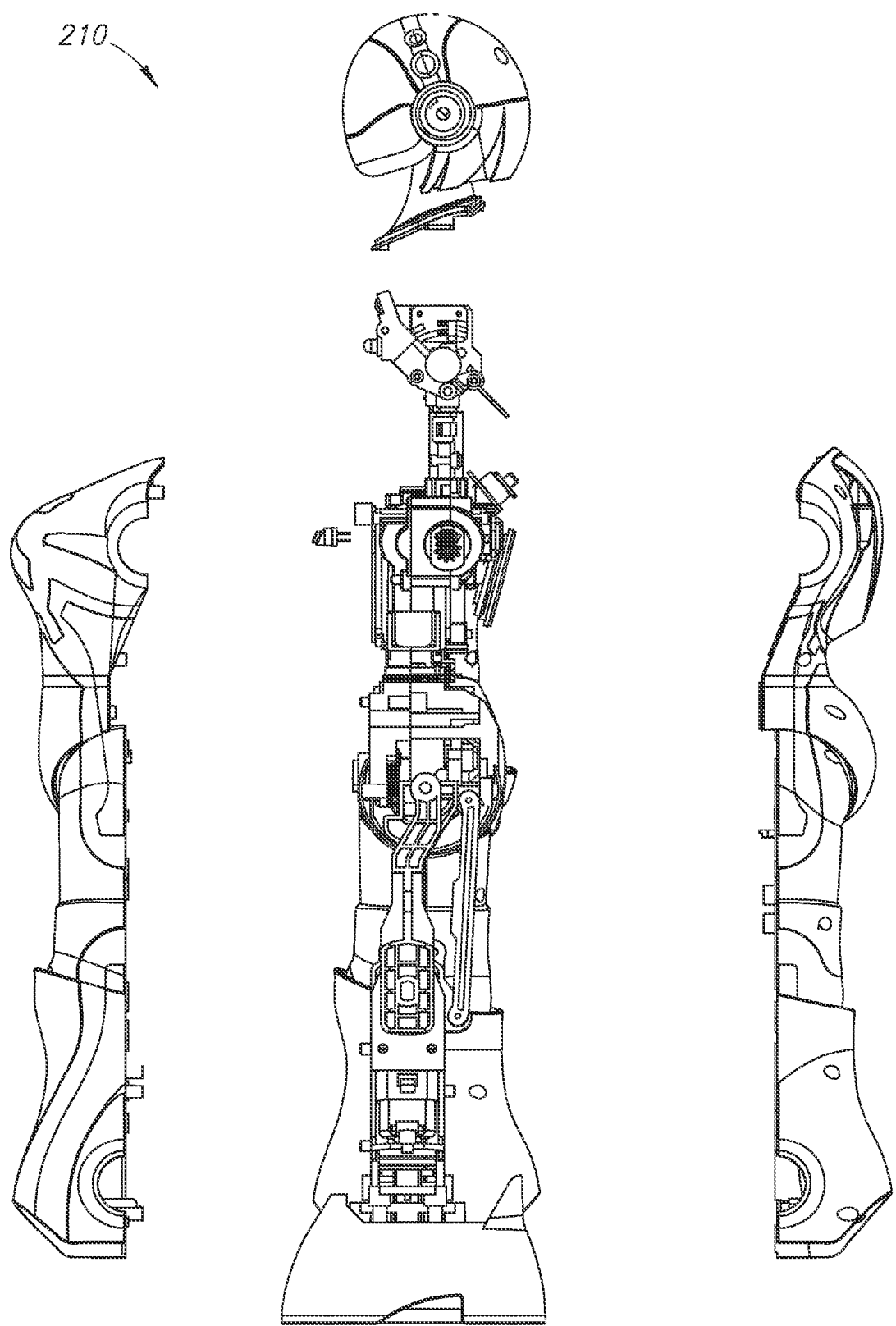
FIG. 3 is a schematic illustration of a cross section side view of a bi-pedal locomotive robot, constructed and operative in accordance with a further embodiment of the disclosed technique.
Figure 4:
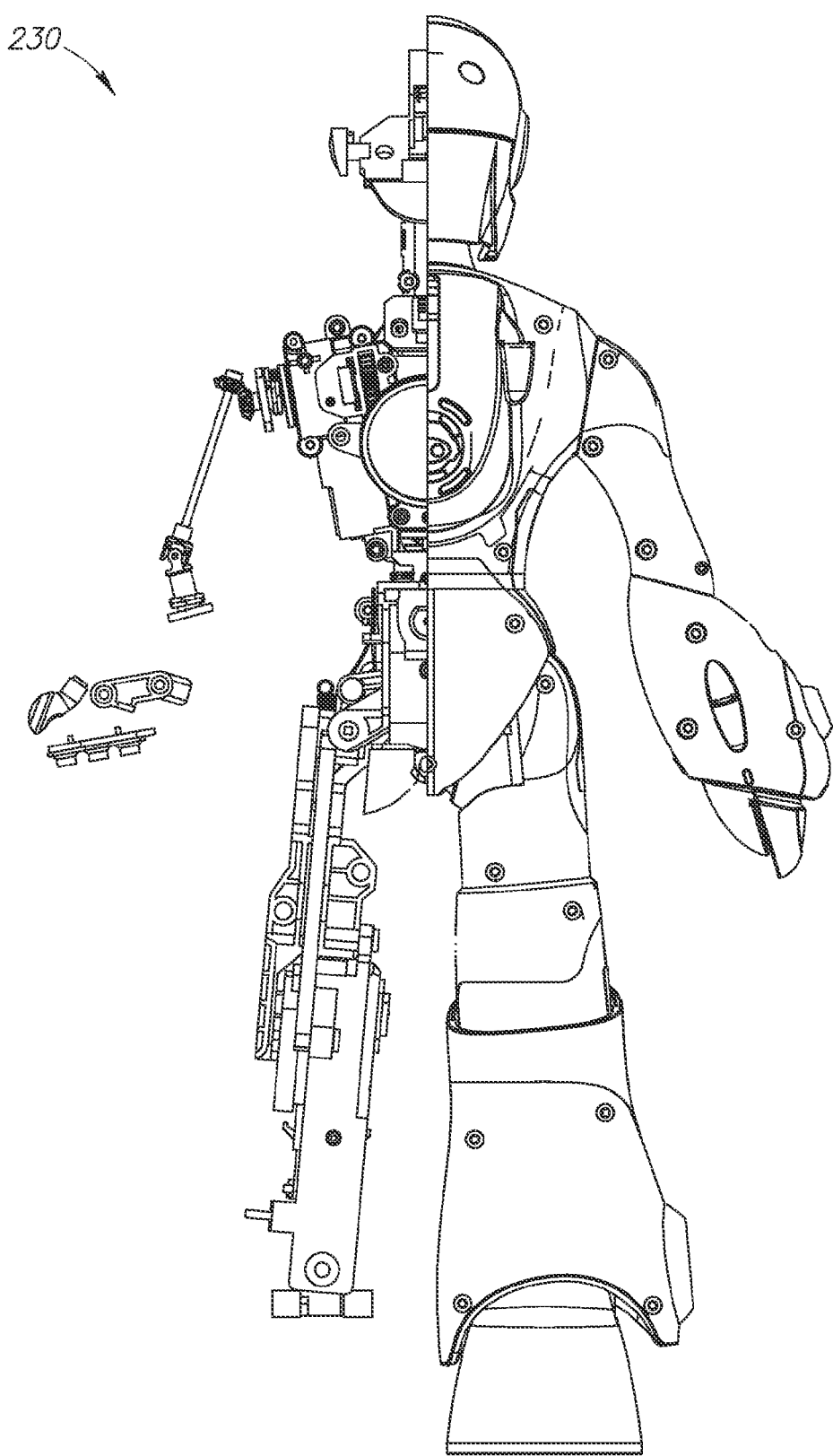
FIG. 4 is a schematic illustration of a rear view of the bi-pedal locomotive robot of FIG. 3, in which the right side is an external view and the left side is a view of the internal parts, constructed and operative in accordance with another embodiment of the disclosed technique.
Figure 5:
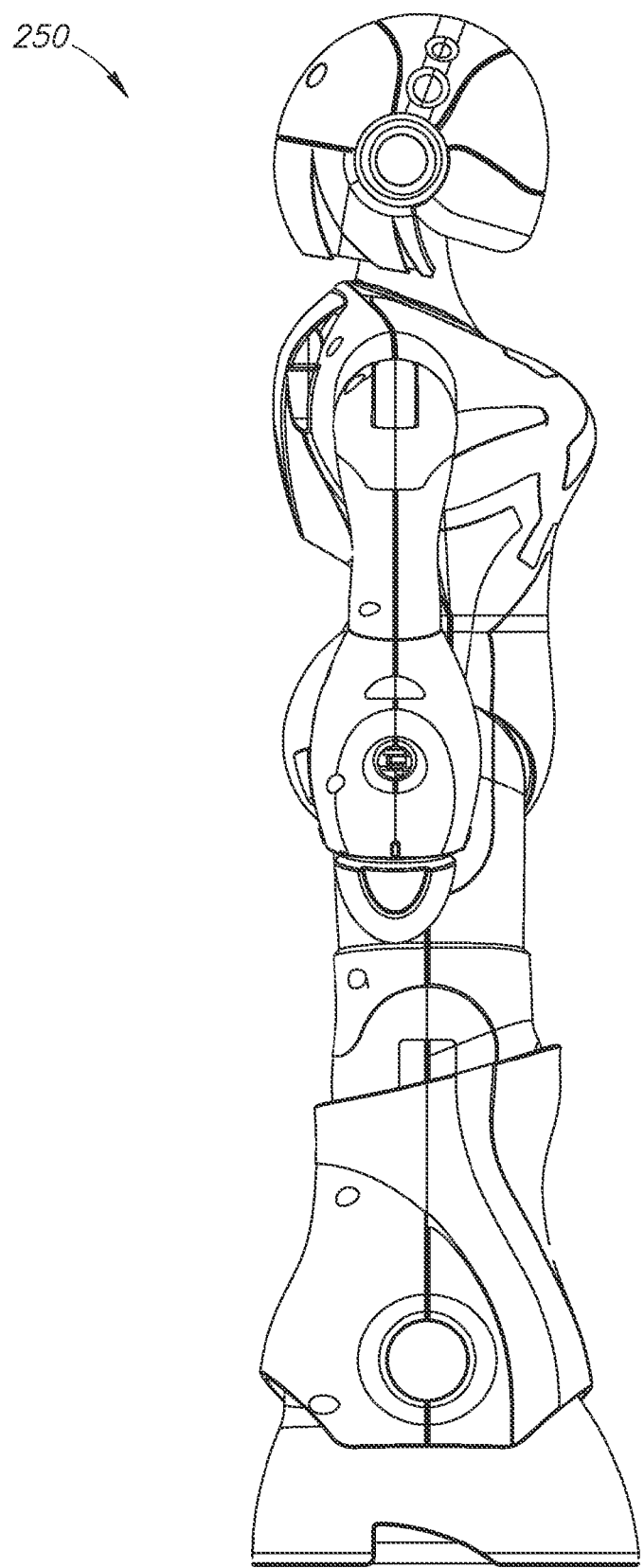
FIG. 5 is a schematic illustration of an external side view of the bi-pedal locomotive robot of FIG. 3, constructed and operative in accordance with a further embodiment of the disclosed technique.

Reference is now made to FIGS. 3, 4, 5, 6, 7, 8, 9, 10, 11, 12, and 13. FIG. 3 is a schematic illustration of a cross section side view of a bi-pedal locomotive robot, generally referenced 210, constructed and operative in accordance with a further embodiment of the disclosed technique. FIG. 4 is a schematic illustration of a rear view of bi-pedal locomotive robot 210 of FIG. 3, in which the right side is an external view and the left side is a view of the internal parts, constructed and operative in accordance with another embodiment of the disclosed technique. FIG. 5 is a schematic illustration of an external side view of the bi-pedal locomotive robot 210 of FIG. 3, constructed and operative in accordance with a further embodiment of the disclosed technique.

Figure 6:
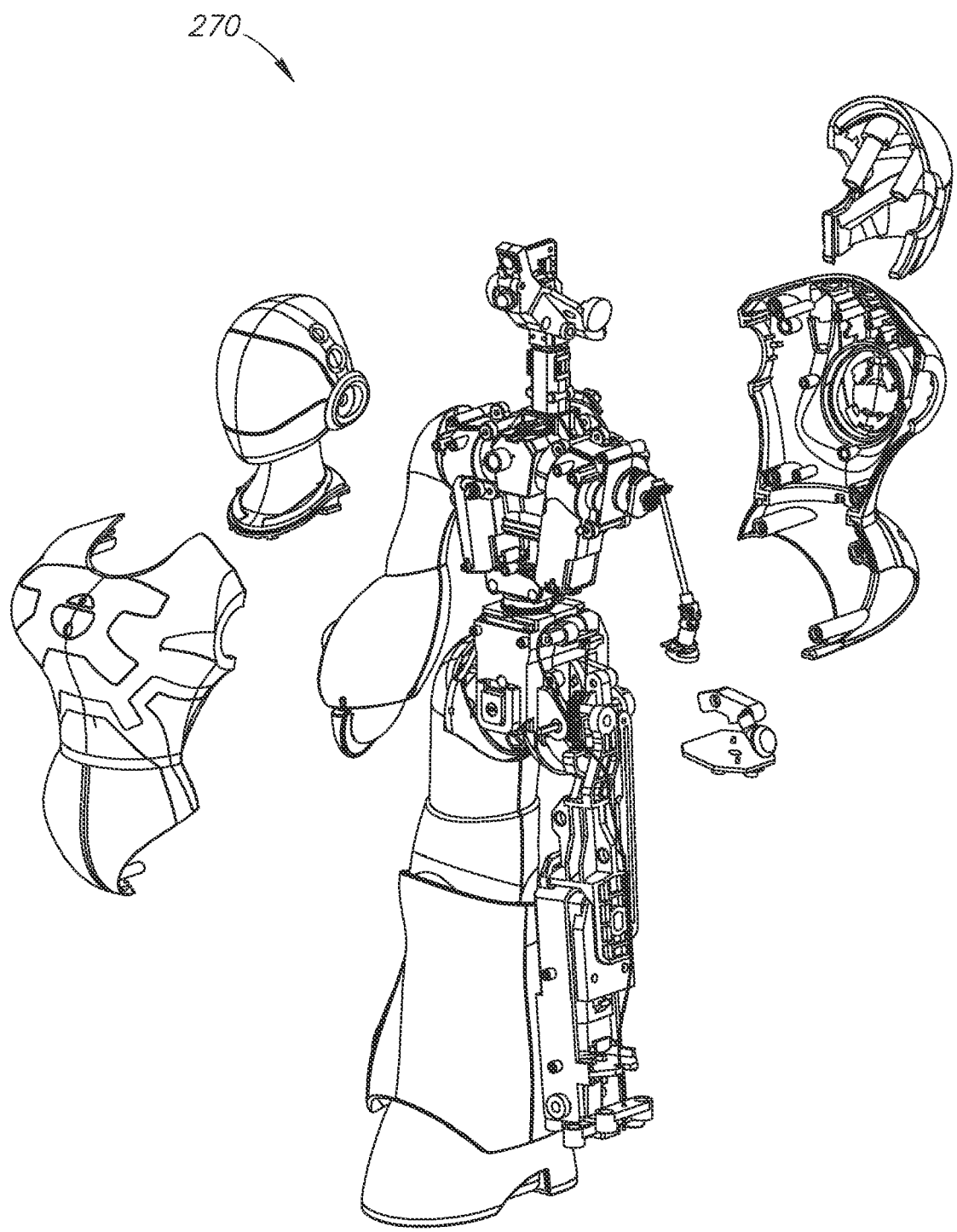
FIG. 6 is a schematic illustration of an isometric view of the bi-pedal locomotive robot of FIG. 3, in which the right side is a view of the internal parts and the left side is an external view, constructed and operative in accordance with another embodiment of the disclosed technique.
Figure 7:
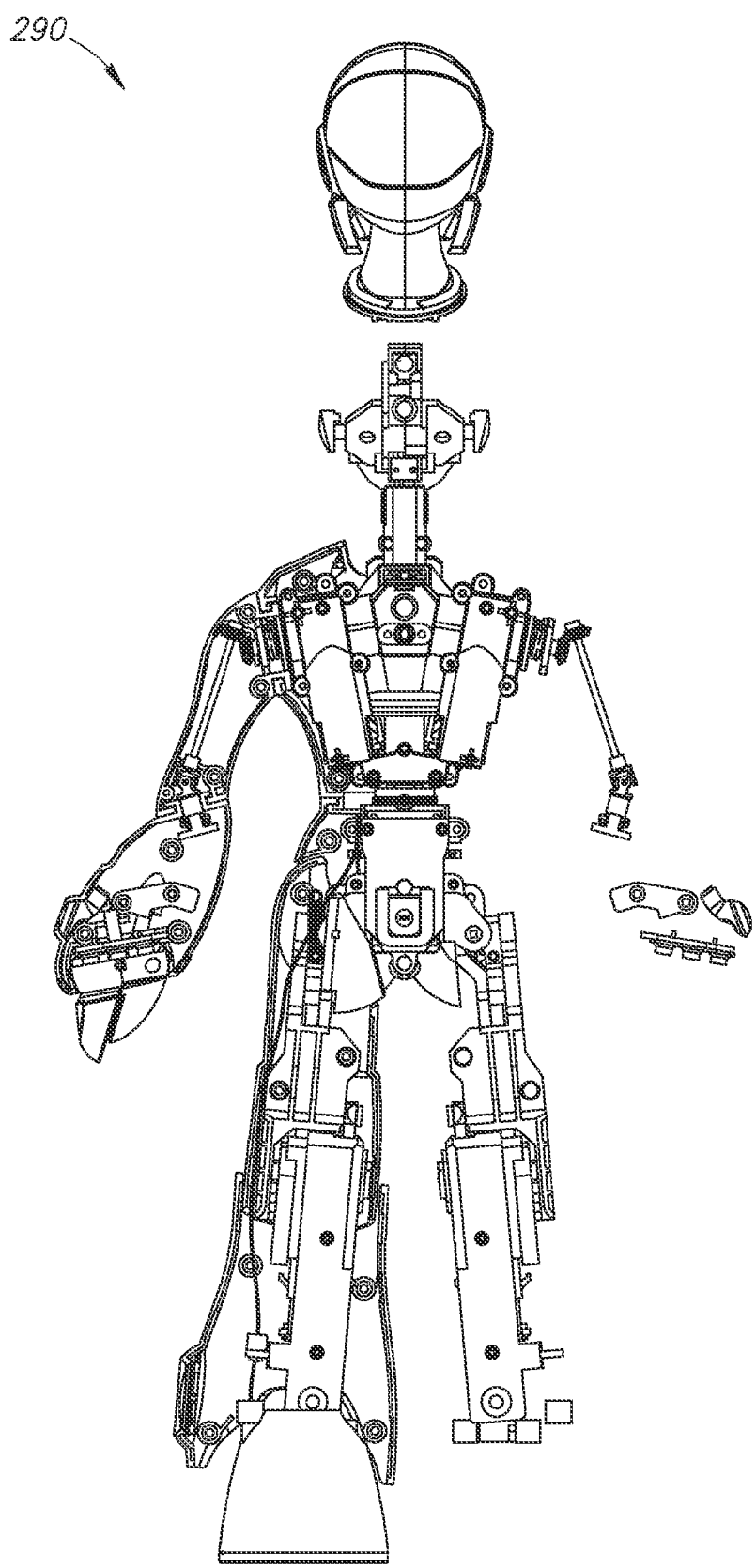
FIG. 7 is a schematic illustration of a rear view of the bi-pedal locomotive robot of FIG. 3, in which the right side is a view of the internal parts and the left side is a cross section view, constructed and operative in accordance with a further embodiment of the disclosed technique.
Figure 8:
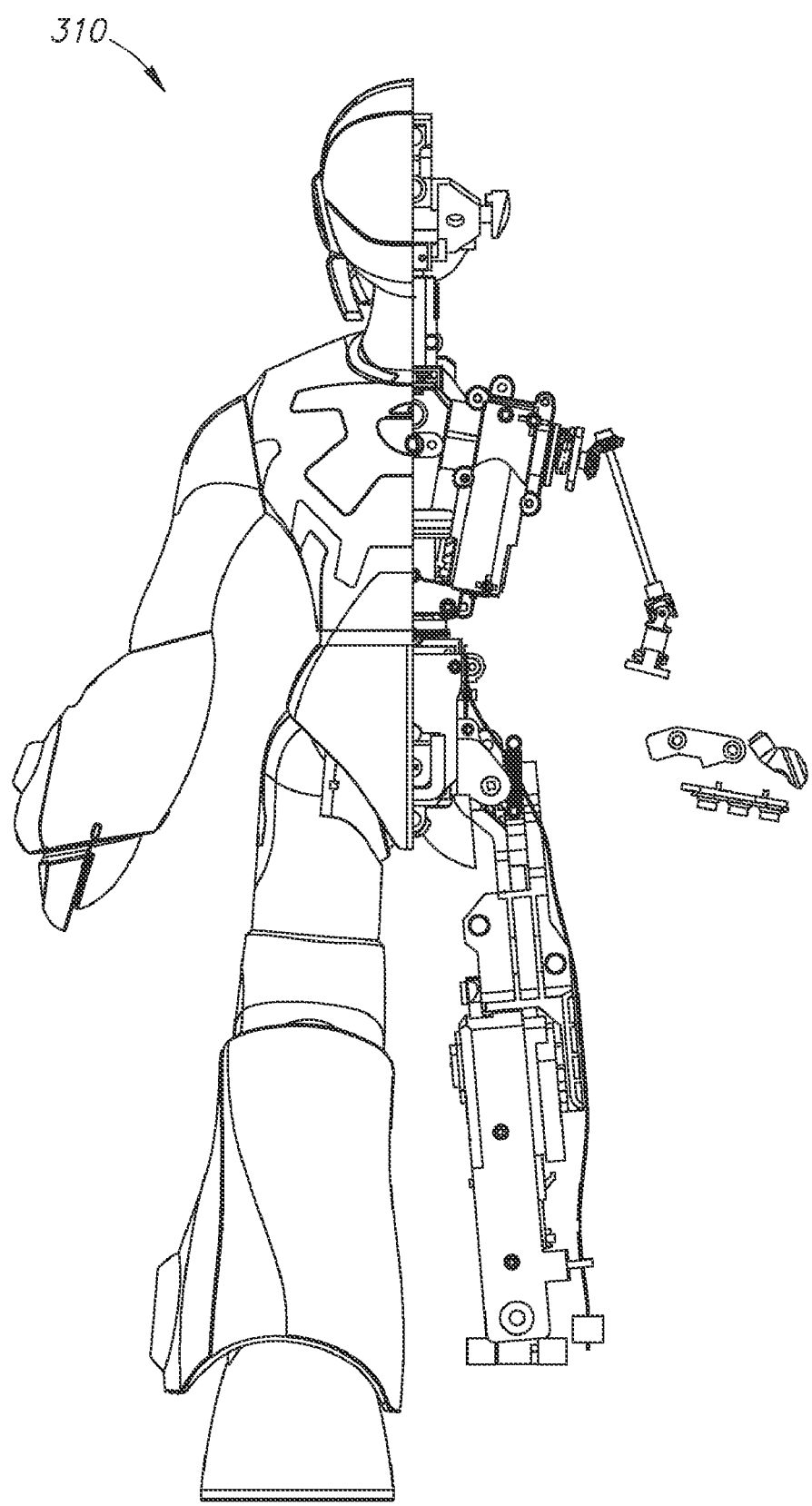
FIG. 8 is a schematic illustration of a front view of the bi-pedal locomotive robot of FIG. 3, in which the right side is a view of the internal parts and the left side is an external view, constructed and operative in accordance with another embodiment of the disclosed technique.

FIG. 6 is a schematic illustration of an isometric view of the bi-pedal locomotive robot 210 of FIG. 3, in which the right side is a view of the internal parts and the left side is an external view, constructed and operative in accordance with another embodiment of the disclosed technique. FIG. 7 is a schematic illustration of a rear view of the bi-pedal locomotive robot 210 of FIG. 3, in which the right side is a view of the internal parts and the left side is a cross section view, constructed and operative in accordance with a further embodiment of the disclosed technique. FIG. 8 is a schematic illustration of a front view of the bi-pedal locomotive robot 210 of FIG. 3, in which the right side is a view of the internal parts and the left side is an external view, constructed and operative in accordance with another embodiment of the disclosed technique.

Figure 9:
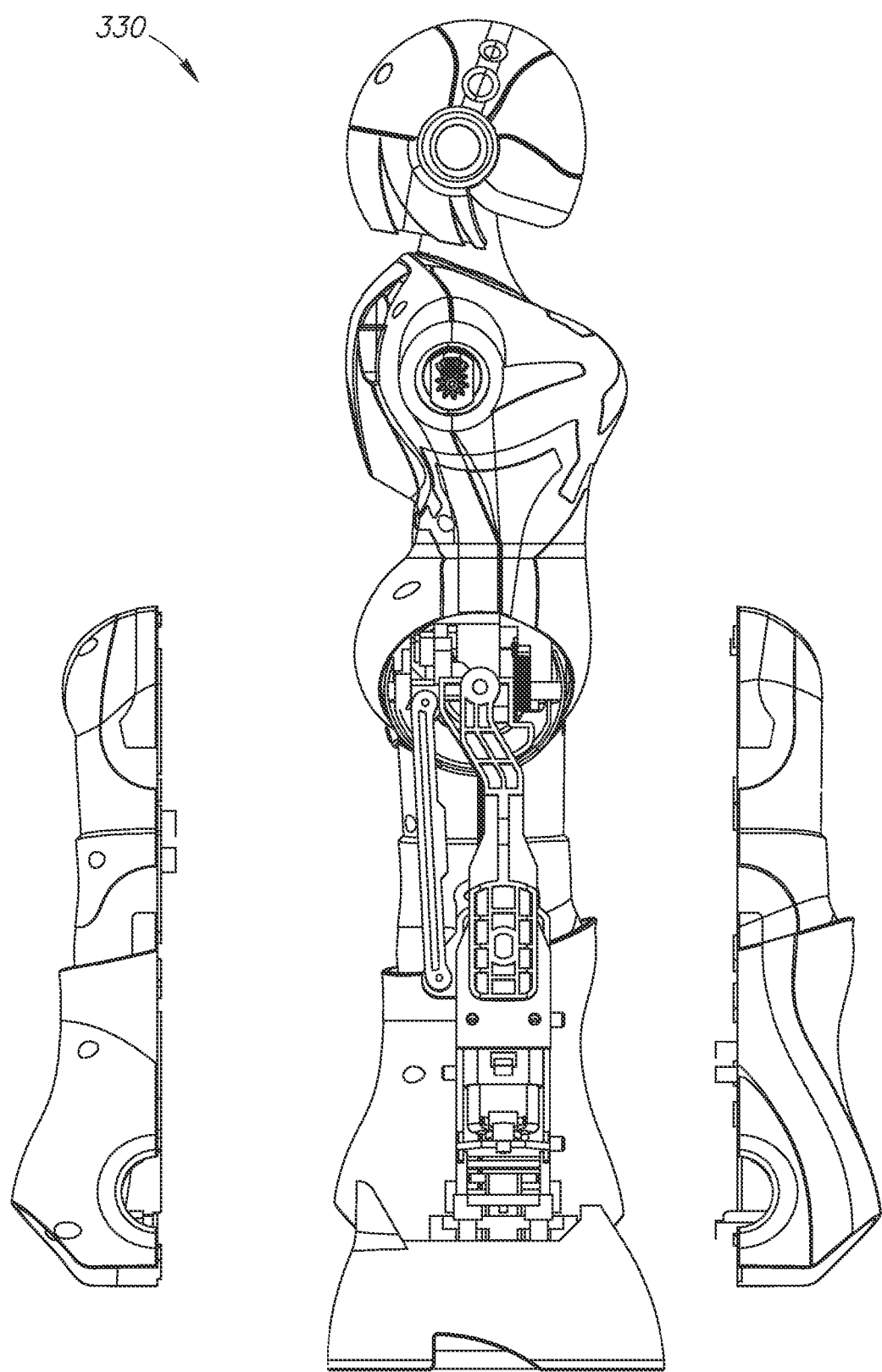
FIG. 9 is a schematic illustration of a side view of the bi-pedal locomotive robot of FIG. 3, in which the leg is in a cross section view, constructed and operative in accordance with a further embodiment of the disclosed technique.
Figure 10:
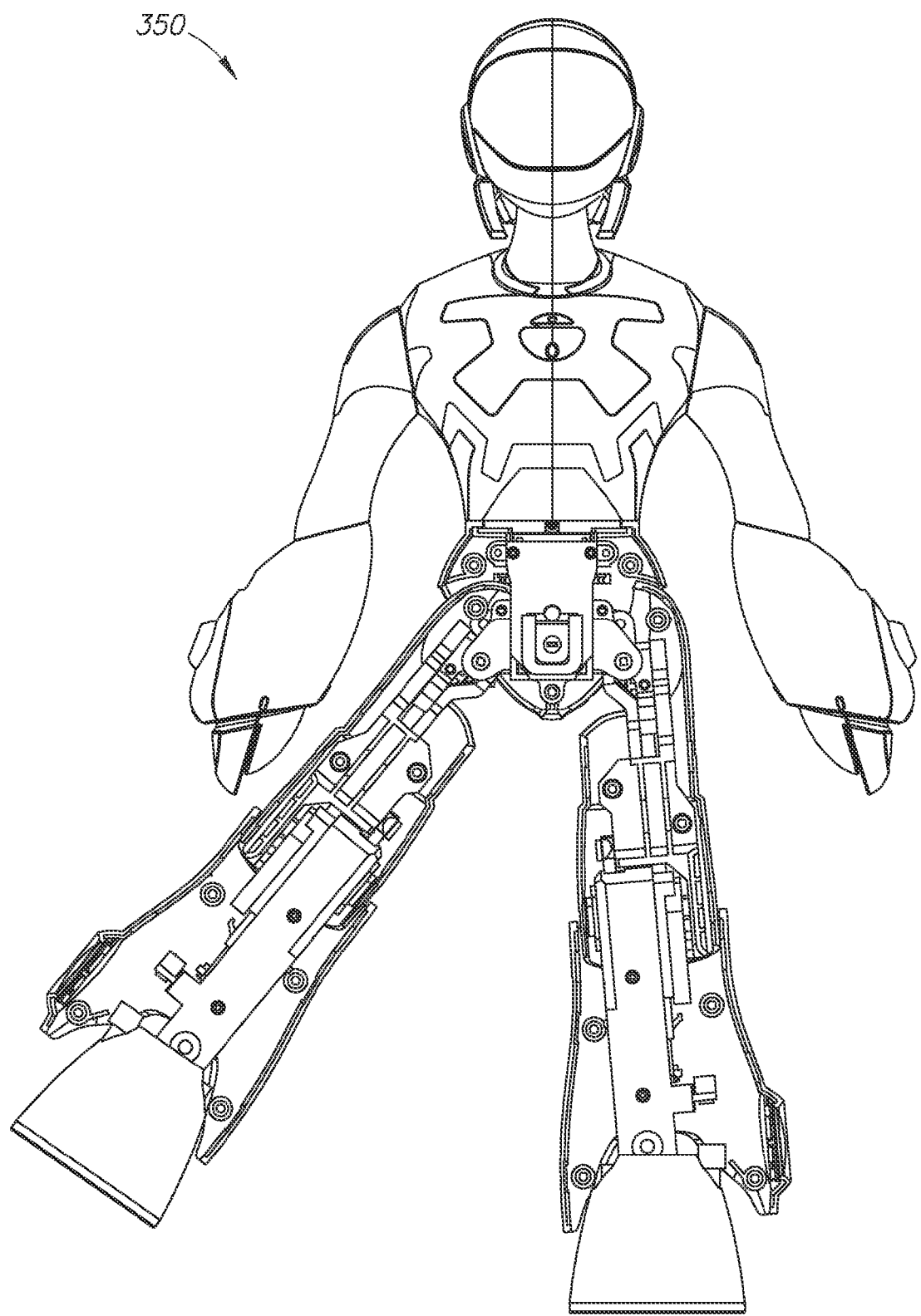
FIG. 10 is a schematic illustration of a front view of the bi-pedal locomotive robot of FIG. 3, in which the legs are in a cross section view and the torso and head are in an external view, constructed and operative in accordance with another embodiment of the disclosed technique.
Figure 11:
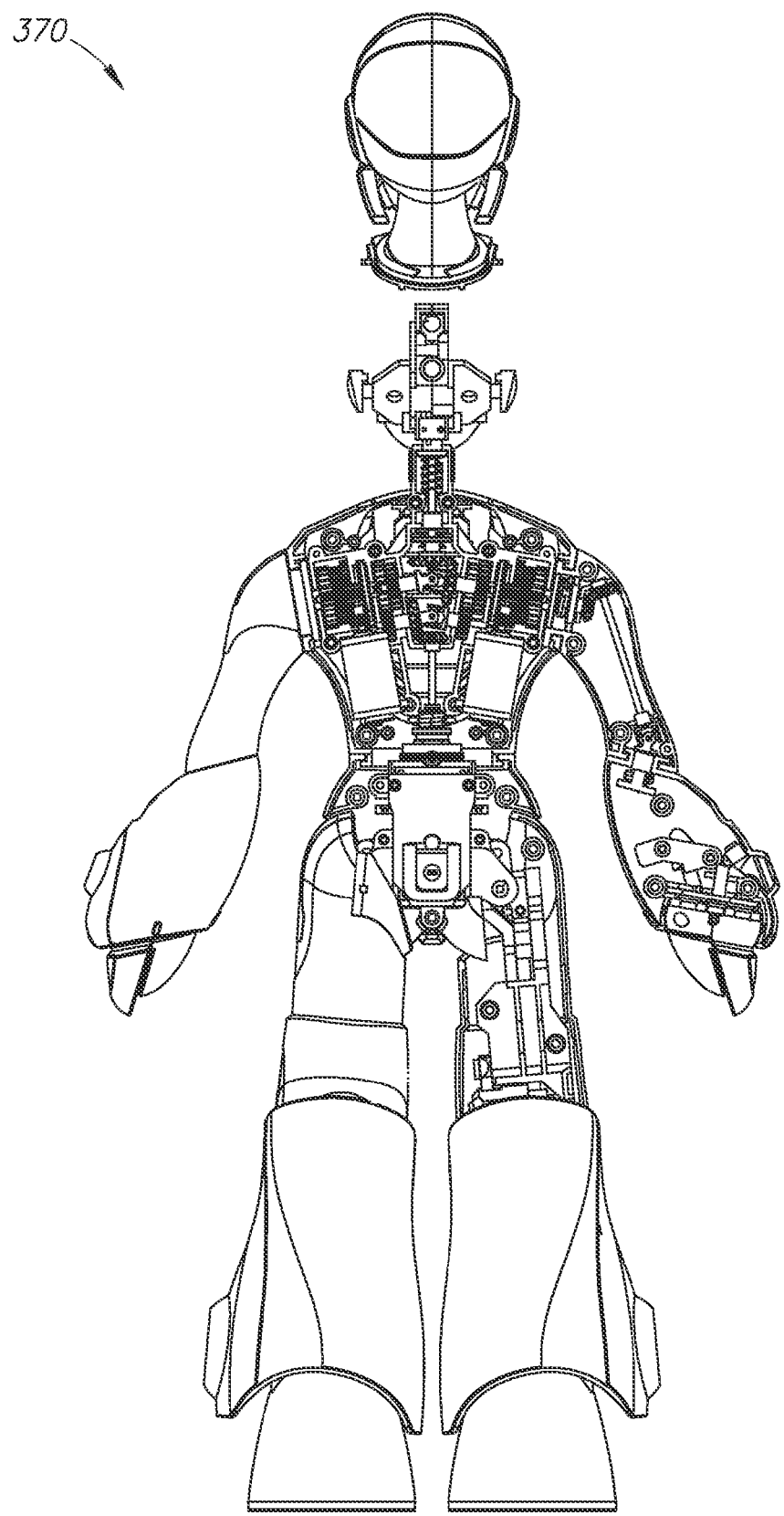
FIG. 11 is a schematic illustration of a front view of the bi-pedal locomotive robot of FIG. 3, in which the left leg and left arm are in an external view and the rest of the body is in a cross section view, constructed and operative in accordance with a further embodiment of the disclosed technique.

FIG. 9 is a schematic illustration of a side view of the bi-pedal locomotive robot 210 of FIG. 3, in which the leg is in a cross section view, constructed and operative in accordance with a further embodiment of the disclosed technique. FIG. 10 is a schematic illustration of a front view of the bi-pedal locomotive robot 210 of FIG. 3, in which the legs are in a cross section view and the torso and head are in an external view, constructed and operative in accordance with another embodiment of the disclosed technique. FIG. 11 is a schematic illustration of a front view of the bi-pedal locomotive robot 210 of FIG. 3, in which the left leg and left arm are in an external view and the rest of the body is in a cross section view, constructed and operative in accordance with a further embodiment of the disclosed technique.

Figure 12:
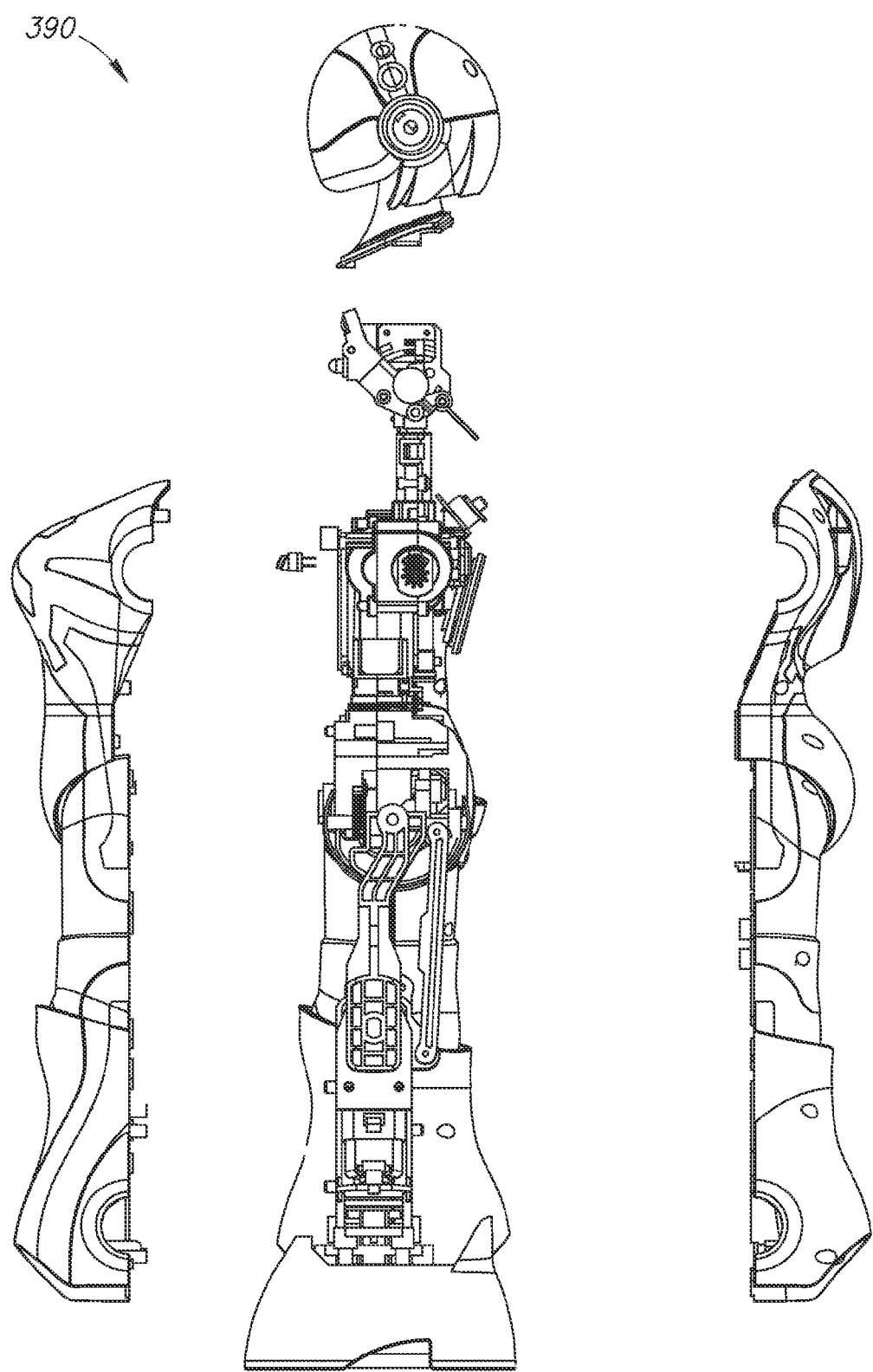
FIG. 12 is a schematic illustration of a cross section of a side view of the bi-pedal locomotive robot of FIG. 3, constructed and operative in accordance with another embodiment of the disclosed technique.
Figure 13:
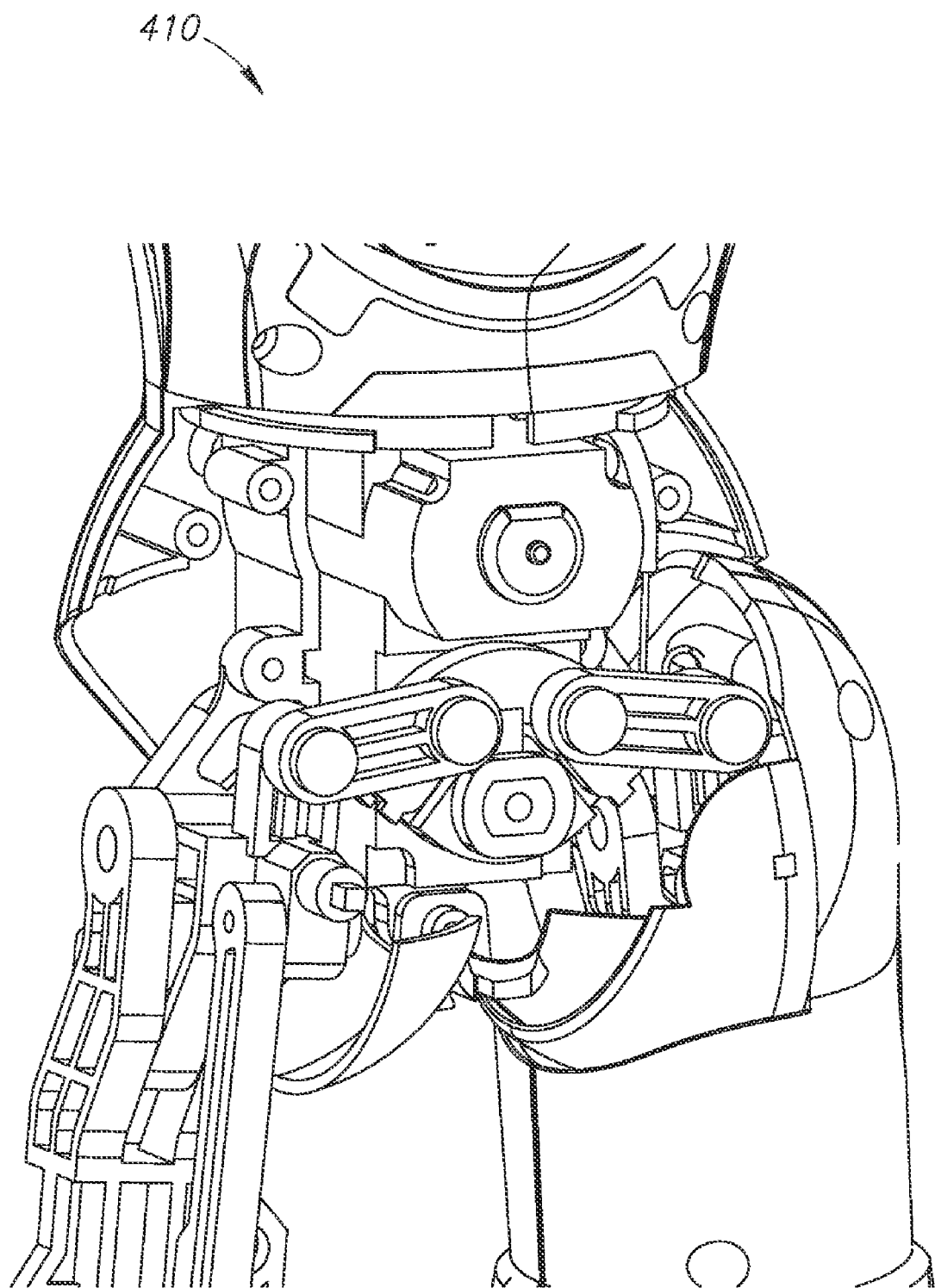
FIG. 13 is a schematic illustration of a cross section of an isometric view of a pelvis of the bi-pedal locomotive robot of FIG. 3, constructed and operative in accordance with a further embodiment of the disclosed technique.

FIG. 12 is a schematic illustration of a cross section of a side view of the bi-pedal locomotive robot 210 of FIG. 3, constructed and operative in accordance with another embodiment of the disclosed technique. FIG. 13 is a schematic illustration of a cross section of an isometric view of a pelvis of the bi-pedal locomotive robot 210 of FIG. 3, constructed and operative in accordance with a further embodiment of the disclosed technique. It will be appreciated by persons skilled in the art that the disclosed technique is not limited to what has been particularly shown and described hereinabove. Rather the scope of the disclosed technique is defined only by the claims, which follow.

The invention claimed is:

1. Walking bi-pedal robot, the robot comprising:
a pelvis;
a right leg, coupled with said pelvis via a right hip lateral angular joint and via a right hip antero-posterior angular joint, said right hip lateral angular joint enabling lateral angular motion of said right leg, said right hip antero-posterior angular joint enabling antero-posterior angular motion of said right leg;

a left leg, coupled with said pelvis via a left hip lateral angular joint and via a left hip antero-posterior angular joint, said left hip lateral angular joint enabling lateral angular motion of said left leg, said left hip antero-posterior angular joint enabling antero-posterior angular motion of said left leg;

a right foot, coupled at the distal end of said right leg via a right ankle lateral angular joint;

a right foot cable, one end of said right foot cable being coupled with the exterior side of said right foot;

a left foot, coupled at the distal end of said left leg via a left ankle lateral angular joint;

a left foot cable, one end of said left foot cable being coupled with the exterior side of said left foot;

a pelvis motor, coupled with said right leg, said left leg, the other end of said right cable and with the other end of said left cable, said pelvis motor producing mechanical motion for generating lateral angular displacement of said right leg and of said left leg about said right hip lateral angular joint and said left hip lateral angular joint respectively and pulling one of said left cable and said right cable according to the direction of said lateral angular displacement;

a right leg motor, coupled with said right hip antero-posterior angular joint for generating antero-posterior angular displacement of said right leg;

a left leg motor, coupled with said left hip antero-posterior angular joint for generating antero-posterior angular displacement of said left leg;

a power source, coupled with said pelvis motor, said right leg motor and with said left leg motor for providing power thereto.

2. The walking bi-pedal robot of claim 1, wherein said pelvis motor producing mechanical motion for rotating said right leg and said left leg about said right hip lateral angular joint and said left hip lateral angular joint respectively until the center of mass of said robot is positioned above said right foot, said pelvis motor pulling said right cable until said left leg is lifted above the ground, said left leg motor rotates said left leg anteriorly about said left hip antero-posterior angular joint, and wherein said pelvis motor producing mechanical motion for rotating said right leg and said left leg about said right hip lateral angular joint and said left hip lateral angular joint respectively until the center of mass of said robot is positioned above said left foot, said pelvis motor pulling said left cable until said right leg is lifted above the ground, said right leg motor rotates said right leg anteriorly about said right hip antero-posterior angular joint, thereby said robot performs a forward stepping cycle.

3. The walking bi-pedal robot of claim 1, wherein said pelvis motor producing mechanical motion for rotating said right leg and said left leg about said right hip lateral angular joint and said left hip lateral angular joint respectively until the center of mass of said robot is positioned above said right foot, said pelvis motor pulling said right cable until said left leg is lifted above the ground, said left leg motor rotates said left leg anteriorly about said left hip antero-posterior angular joint, and wherein said pelvis motor producing mechanical motion for rotating said right leg and said left leg about said right hip lateral angular joint and said left hip lateral angular joint respectively until said left foot touches the ground, said left leg motor extending said left leg while said left foot maintains its position on the ground, said right leg motor flexing said right leg while said right foot maintains its position on the ground, thereby said robot performs a clockwise turn.

4. The walking bi-pedal robot of claim 1, further comprising a transmission box coupled between said pelvis motor and said right hip lateral angular joint, said left hip lateral angular joint, said transmission box transmitting said mechanical motion from said pelvis motor to each of said right leg and said left leg, via said right hip lateral angular joint and said left hip lateral angular joint, respectively.

5. The walking bi-pedal robot of claim 4, wherein the lateral angular rotation rate of said right leg about said lateral right angular joint and the lateral angular rotation rate of said left leg about said lateral left angular joint are equal.

6. The walking bi-pedal robot of claim 4, wherein the lateral angular rotation rate of said right leg about said lateral right angular joint and the lateral angular rotation rate of said left leg about said lateral left angular joint are differential.

7. The walking bi-pedal robot of claim 4, wherein said transmission box is further coupled between said pelvis motor and said right foot cable and said left foot cable, said transmission box further transmitting said mechanical motion for pulling on said foot right cable and on said left foot cable.

8. The walking bi-pedal robot of claim 1, wherein said left foot touches the ground and dumps the swaying of said robot when the center of mass of said robot is positioned above said right foot and said robot is swaying to the left, and wherein said right foot touches the ground and dumps the swaying of said robot when the center of mass of said robot is positioned above said left foot and said robot is swaying to the right.

9. The walking bi-pedal robot of claim 1, wherein each of said pelvis motor, said right leg motor and said left leg motor, generating mechanical motion, chronologically separately from each other.

10. The walking bi-pedal robot of claim 1, wherein two of said pelvis motor, said right leg motor and said left leg motor, are generating mechanical motion simultaneously.

11. The walking bi-pedal robot of claim 1, wherein each of said pelvis motor, said right leg motor and said left leg motor is selected from the group consisting of:
 a rotary electromechanical motor
 a linear electromechanical motor
 an hydraulic actuator; and
 a pneumatic actuator.

* * * * *